US009178664B2

(12) United States Patent
Earnshaw et al.

(10) Patent No.: US 9,178,664 B2
(45) Date of Patent: Nov. 3, 2015

(54) METHOD AND SYSTEM FOR HANDLING OF A TRANSPORT BLOCK SIZE CHANGE IN AN ADAPTIVE RETRANSMIT ORDER

(75) Inventors: Mark Earnshaw, Kanata (CA); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 683 days.

(21) Appl. No.: 13/490,962

(22) Filed: Jun. 7, 2012

(65) Prior Publication Data

US 2013/0182653 A1 Jul. 18, 2013

Related U.S. Application Data

(60) Provisional application No. 61/585,995, filed on Jan. 12, 2012.

(51) Int. Cl.
  *H04L 1/18* (2006.01)
  *H04L 1/00* (2006.01)

(52) U.S. Cl.
  CPC ............ *H04L 1/1822* (2013.01); *H04L 1/0003* (2013.01); *H04L 1/0007* (2013.01); *H04L 1/0009* (2013.01); *H04L 1/1819* (2013.01)

(58) Field of Classification Search
  None
  See application file for complete search history.

(56) References Cited

U.S. PATENT DOCUMENTS

| 2010/0238823 | A1 | 9/2010 | Chen et al. |
| 2011/0035639 | A1 | 2/2011 | Earnshaw et al. |
| 2011/0223924 | A1* | 9/2011 | Lohr et al. .................. 455/450 |

FOREIGN PATENT DOCUMENTS

WO 2011120055 A2 9/2011

OTHER PUBLICATIONS

3GPP TS 36.321 V10.3.0 (Sep. 2011) 3rd Generation Partnership Project; Technical Specification Group Radio Access Network; Evolved Universal Terrestrial Radio Access (E-UTRA); Medium Access Control (MAC) protocol specification (Release 10), pp. 21-24.*
Samsung "updates from the offline discussions on R2-092981 and R2-092984", 3GPP TSG RAN WG2 #66, May 4-8, 2009, San Francisco, USA, R2-093551, entire document.*
HTC Corporation, "NDI Hnadling and BSR loss probelm with temporary C-RNTI in consideration", 3GPP TSG-RAN WG2 #66bis, Jun. 29-Jul. 3, 2009, Los Angeles, USA, R2-093949.*
3GPP TS 36.300 V10.3.0 (Mar. 2011) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).*
PCT International Search Report; Application No. PCT/US2013/021233; Mar. 22, 2013; 8 pages.

(Continued)

*Primary Examiner* — Joseph Bednash
(74) *Attorney, Agent, or Firm* — Conley Rose, P.C.; J. Robert Brown, Jr.

(57) ABSTRACT

A method and apparatus for handling a downlink control information indication for retransmission, the method receiving a downlink control information indication for retransmission of a hybrid automatic repeat request (HARQ) process; and if a transport block size in the downlink control information has changed compared with a transport block size associated with the HARQ process or a previous uplink grant for the HARQ process: handling the downlink control information indication for retransmission.

6 Claims, 6 Drawing Sheets

(56) References Cited

OTHER PUBLICATIONS

ASUSTeK, 3GPP TSG-RAN2 Meeting #65, Athens, Greece, Feb. 9-13, 2009, CR to 36.321 on UL grant misuse after contention resolution (R2-091217); 5 pages.

ASUSTeK, 3GPP TSG-RAN WG2 #65, Athens, Greece, Feb. 9-13, 2009, UL grant misuse after contention resolution (R2-091216); 4 pages.

Ericsson, 3GPP TSG-RAN2 Meeting #64-bis, Ljubljana, Slovenia, Jan. 12-16, 2009, Enforcing new transmission after flushing HARQ process (R2-090211); 5 pages.

Huawei et al, 3GPP TSG-RAN WG2 Meeting #64, Nov. 10-14, Prague, Czech Republic, Clarifying UE behaviour when erroneous NDI is received (R2-086618); 6 pages.

Nokia Corp et al, 3GPP TSG-RAN2 Meeting #64, Prague, Czech Republic, Oct. 10-14, 2008, Adaptive retransmissions with empty buffer (R2-086097); 3 pages.

* cited by examiner

METHOD AND SYSTEM FOR HANDLING OF A TRANSPORT BLOCK SIZE CHANGE IN AN ADAPTIVE RETRANSMIT ORDER

CROSS-REFERENCE TO RELATED APPLICATIONS

The present application is a non-provisional of U.S. Provisional Application No. 61/585,995, filed Jan. 12, 2012, the entire contents of which are incorporated herein by reference.

FIELD OF THE DISCLOSURE

The present disclosure relates to adaptive retransmission of existing transport blocks and in particular to adaptive retransmission of existing transport blocks where the size of the transport blocks indicated is different from the size of an existing transport block.

BACKGROUND

In the 3rd Generation Partnership Project Radio Access Network, Radio layer 2 and Radio layer 3 radio resources (RAN2) working groups, an uplink Hybrid Automatic Repeat Request (HARQ) entity is conceptually in charge of co-ordinating user equipment (UE) operation in order to provide data for uplink transmission as appropriate. At each transmission opportunity, the uplink HARQ process associated with that transmission opportunity may be instructed by the uplink HARQ entity to perform various actions, including a new data transmission, adaptive retransmission, non-adaptive retransmission or nothing.

An adaptive retransmission allows for different physical resources or parameters, signaled through downlink control information than for the most recent transmission of the same transport block. Conversely, non-adaptive retransmission is performed using the same physical resources as the most recent transmission for the same transport block but with a different redundancy version. New data transmissions and adaptive retransmissions have priority over non-adaptive retransmissions for the same transmission opportunity.

For adaptive retransmission, the Downlink Control Information (DCI) format 0 (DCI 0) is used to signal the retransmission. In some cases and for various reasons the UE may see a DCI 0 ordered adaptive retransmission where the transport block size has changed without a New Data Indicator (NDI) flag having been changed. This may be caused, for example, by a UE failing to detect a DCI 0 on the physical downlink control channel (PDCCH) which was transmitted by the Evolved Node B (eNB). Such missed detection is termed a false negative, and may occur due to poor or changing channel conditions, sudden interference and other variable conditions typically associated with wireless transmission channels. Further, the UE may, from time to time, detect a DCI 0 on the PDCCH which is not actually representative of a DCI 0 that was transmitted from the eNB. Such detection is termed a false positive and may interfere with normal UE operation.

Thus, in some situations, a UE may detect a DCI 0 addressed to the UE with a non-toggled NDI and with a different transport block size.

BRIEF DESCRIPTION OF THE DRAWINGS

The present disclosure will be better understood with reference to the drawings, in which.

DETAILED DESCRIPTION OF THE DRAWINGS

Figure 1:
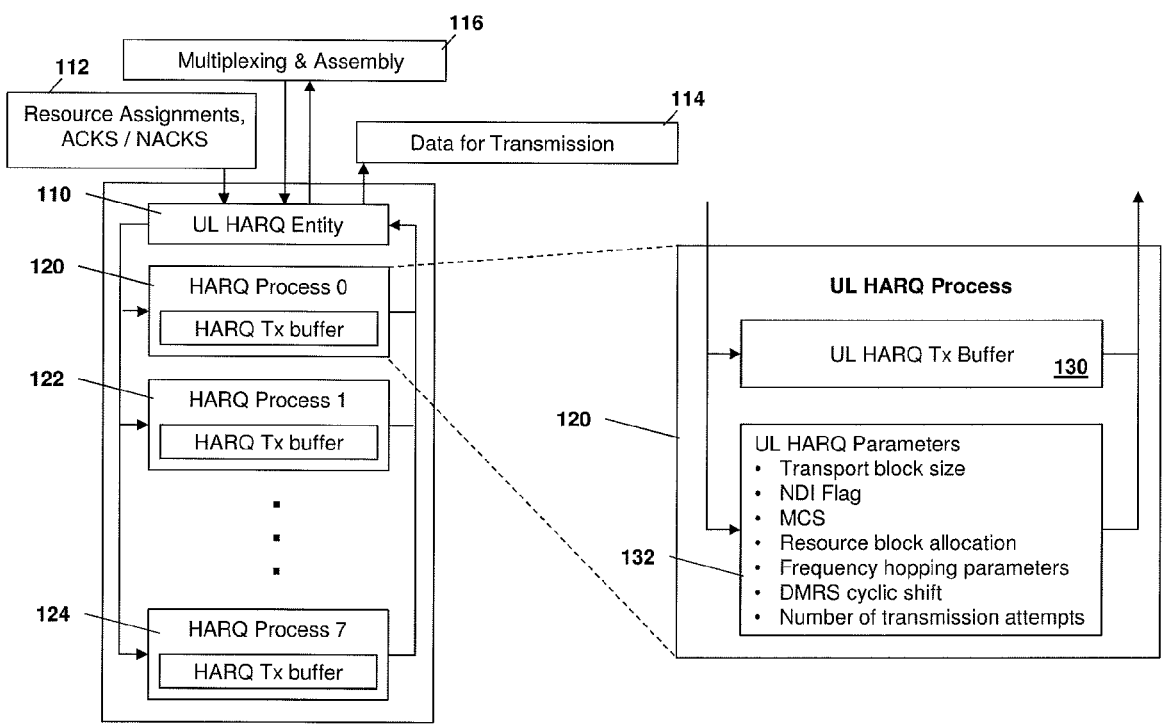
FIG. 1 is a block diagram of an example uplink HARQ entity.

The present disclosure provides a method comprising: receiving, at a user equipment, a downlink control information indication for retransmission of a hybrid automatic repeat request (HARQ) process; and if a transport block size in the downlink control information has changed compared with a transport block size associated with the HARQ process or a previous uplink grant for the HARQ process: handling the downlink control information indication for retransmission.

In one embodiment, the retransmission is adaptive retransmission. In a further embodiment, the downlink control information is for a cell radio network temporary identifier (C-RNTI) for the user equipment. In the further embodiment, the handling may comprise treating the downlink control information as representing a new data transmission. In one embodiment the user equipment considers a new data indicator flag to have been toggled.

In a further embodiment, the handling comprises discarding an uplink grant associated with the downlink control information.

In a further embodiment, the handling comprises ignoring the transport block size in the downlink control information and utilizing the transport block size associated with the HARQ process or with the previous uplink grant for the HARQ process.

In a further embodiment, the handling comprises selecting, by the user equipment, one of: treating the downlink control information as representing a new data transmission; discarding an uplink grant associated with the downlink control information; and ignoring the transport block size in the downlink control information and utilizing the transport block size associated with the HARQ process or with the previous uplink grant for the HARQ process. In the further embodiment, the selecting for the C-RNTI may be independent of a selection for a semi persistent scheduling (SPS) C-RNTI and a Temporary C-RNTI.

In one embodiment the handling comprises one of: treating the downlink control information as representing a new data transmission; discarding an uplink grant associated with the downlink control information; and ignoring the transport block size in the downlink control information and utilizing the transport block size associated with the HARQ process or with the previous uplink grant for the HARQ process, and wherein the handling for the C-RNTI is independent of a handling for a semi persistent scheduling (SPS) C-RNTI and a Temporary C-RNTI.

In one embodiment the downlink control information is for a semi persistent scheduling (SPS) cell radio network temporary identifier C-RNTI) for the user equipment. In a further embodiment, the handling comprises discarding an uplink grant associated with the downlink control information. In still a further embodiment, the handling comprises ignoring the transport block size in the downlink control information and utilizing the transport block size associated with the HARQ process or with the previous uplink grant for the HARQ process. In still a further embodiment, the handling comprises selecting, by the user equipment, one of: discarding an uplink grant associated with the downlink control information; and ignoring the transport block size in the downlink control information and utilizing the transport block size associated with the HARQ process or with the previous uplink grant for the HARQ process. In one embodiment, the selecting for the SPS C-RNTI may be independent of a selection for a C-RNTI and a Temporary C-RNTI.

In one embodiment the handling comprises one of: discarding an uplink grant associated with the downlink control information; and ignoring the transport block size in the downlink control information and utilizing the transport block size associated with the HARQ process or with the previous uplink grant for the HARQ process, and wherein the handling for the SPS C-RNTI is independent of a handling for a C-RNTI and a Temporary C-RNTI.

In one embodiment the downlink control information is for a Temporary cell radio network temporary identifier (C-RNTI) for the user equipment. In a further embodiment handling comprises discarding an uplink grant associated with the downlink control information. In a further embodiment, the handling comprises ignoring the transport block size in the downlink control information and utilizing the transport block size associated with the HARQ process or with the previous uplink grant for the HARQ process. In a further embodiment the handling comprises selecting, by the user equipment, one of: discarding an uplink grant associated with the downlink control information; and ignoring the transport block size in the downlink control information and utilizing the transport block size associated with the HARQ process or with the previous uplink grant for the HARQ process. In a further embodiment the selecting for the Temporary C-RNTI is independent of a selection for a semi persistent scheduling (SPS) C-RNTI and a C-RNTI.

In one embodiment the handling comprises one of: discarding an uplink grant associated with the downlink control information; and ignoring the transport block size in the downlink control information and utilizing the transport block size associated with the HARQ process or with the previous uplink grant for the HARQ process, and wherein the handling for the Temporary C-RNTI is independent of a handling for a semi persistent scheduling (SPS) C-RNTI and a C-RNTI.

The present disclosure further provides a user equipment comprising: a processor; and a communications subsystem, wherein the user equipment is configured to: receive a downlink control information indication of retransmission of a hybrid automatic repeat request (HARQ) process; and if a transport block size in the downlink control information has changed compared with a transport block size associated with the HARQ process or with a previous uplink grant for the HARQ process: handle the downlink control information indication for retransmission.

In one embodiment the retransmission is adaptive retransmission. In a further embodiment the downlink control information is for a cell radio network temporary identifier (C-RNTI) for the user equipment.

In a further embodiment the user equipment is configured to handle by treating the downlink control information as representing a new data transmission. In one embodiment the user equipment considers a new data indicator flag to have been toggled. In one embodiment the user equipment is configured to handle by discarding an uplink grant associated with the downlink control information. In a further embodiment the user equipment is configured to handle by ignoring the transport block size in the downlink control information and utilizing the transport block size associated with the HARQ process or with the previous uplink grant for the HARQ process.

In one embodiment the user equipment is configured to handle by selecting one of: treating the downlink control information as representing a new data transmission; discarding an uplink grant associated with the downlink control information; and ignoring the transport block size in the downlink control information and utilizing the transport block size associated with the HARQ process or with the previous uplink grant for the HARQ process.

In one embodiment the selecting for the C-RNTI is independent of a selection for a semi persistent scheduling (SPS) C-RNTI and a Temporary C-RNTI. In a further embodiment the user equipment is configured to handle by: treating the downlink control information as representing a new data transmission; discarding an uplink grant associated with the downlink control information; or ignoring the transport block size in the downlink control information and utilizing the transport block size associated with the HARQ process or with the previous uplink grant for the HARQ process, and wherein the selecting for the C-RNTI is independent of a selection for a semi persistent scheduling (SPS) C-RNTI and a Temporary C-RNTI.

In one embodiment the downlink control information is for a semi persistent scheduling (SPS) cell radio network temporary identifier (C-RNTI) for the user equipment.

In some embodiments, the handling comprises discarding an uplink grant associated with the downlink control information. In one embodiment, the handling comprises ignoring the transport block size in the downlink control information and utilizing the transport block size associated with the HARQ process or with the previous uplink grant for the HARQ process.

In one embodiment the user equipment is configured to handle by selecting one of: discarding an uplink grant associated with the downlink control information; and ignoring the transport block size in the downlink control information and utilizing the transport block size associated with the HARQ process or with the previous uplink grant for the HARQ process. In one embodiment the selecting for the SPS C-RNTI is independent of a selection for a C-RNTI and a Temporary C-RNTI.

In one embodiment the user equipment is configured to handle by: discarding an uplink grant associated with the downlink control information; or ignoring the transport block size in the downlink control information and utilizing the transport block size associated with the HARQ process or with the previous uplink grant for the HARQ process, and wherein the selecting for the SPS C-RNTI is independent of a selection for a C-RNTI and a Temporary C-RNTI.

In one embodiment the downlink control information is for a Temporary cell radio network temporary identifier (C-RNTI) for the user equipment. In a further embodiment the handling comprises discarding an uplink grant associated with the downlink control information.

In one embodiment the handling comprises ignoring the transport block size in the downlink control information and utilizing the transport block size associated with the HARQ process or with the previous uplink grant for the HARQ process. In a further embodiment the user equipment is configured to handle by selecting one of: discarding an uplink grant associated with the downlink control information; and ignoring the transport block size in the downlink control information and utilizing the transport block size associated with the HARQ process or with the previous uplink grant for the HARQ process.

In one embodiment the selecting for the Temporary C-RNTI is independent of a selection for a semi persistent scheduling (SPS) C-RNTI and a C-RNTI. In a further embodiment, the user equipment is configured to handle by: discarding an uplink grant associated with the downlink control information; or ignoring the transport block size in the downlink control information and utilizing the transport block size associated with the HARQ process or with the previous uplink grant for the HARQ process, and wherein the selecting for the Temporary C-RNTI is independent of a selection for a semi persistent scheduling (SPS) C-RNTI and a C-RNTI.

Reference is now made to FIG. 1. Conceptually, each UE has an uplink HARQ entity which is in charge of coordinating the UE's uplink HARQ operation and a number of uplink HARQ processes which act as directed by the uplink HARQ entity in order to provide data for uplink transmission as appropriate.

In particular, as seen in FIG. 1, an uplink HARQ entity 110 receives resource assignments, acknowledgements and negative acknowledgements (ACKs/NACKs), shown by block 112. The uplink HARQ entity 110 also provides data for transmission, as shown by block 114.

The uplink HARQ entity 110 further provides for multiplexing and assembly of the resources and data, as shown by block 116.

Uplink HARQ entity 110 further manages a plurality of HARQ processes, shown by blocks 120, 122 and 124 in FIG. 1. In particular, in the example of FIG. 1, eight HARQ processes are shown, although this is not meant to be limiting.

HARQ process 120 is shown in an expanded form in FIG. 1, and includes an uplink HARQ transmission buffer 130 as well as uplink HARQ parameters 132. The uplink HARQ transmission buffer stores information bits which are transmitted and HARQ parameters 132 provide for resource assignments and other physical layer parameters, including the transport block size, the NDI flag, modulation and coding scheme (MCS), resource block allocation, frequency hopping parameters, the demodulation reference signal (DMRS) cyclic shift, and a number of transmission attempts, among other information.

Uplink HARQ in Evolved Universal Terrestrial Radio Access (E-UTRA) is synchronous in nature. In other words, the uplink HARQ process index associated with a particular transmission time interval (TTI) is a function of the TTI value and is not explicitly signaled from the eNB to the UE in any transmission or retransmission instructions. In normal uplink HARQ operation, where TTI bundling is disabled, each of eight uplink HARQ processes has a transmission opportunity which occurs every 8 milliseconds. Thus, the transmission opportunity may be every 8 subframes, where every subframe is 1 millisecond in length. This may occur, for example, in a frequency division duplex (FDD) system. The uplink HARQ entity can use the current frame and subframe indices to determine which uplink HARQ process is associated with the current TTI.

Figure 2:
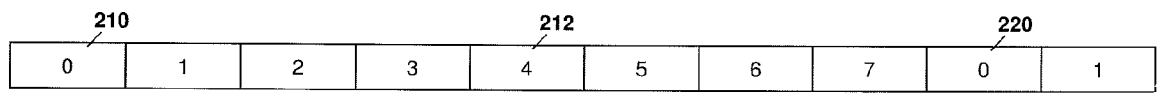
FIG. 2 is a block diagram showing subframe transmission timing.

Reference is now made to FIG. 2, which shows synchronous uplink HARQ operation in an FDD system. In particular, at subframe 0, shown by reference numeral 210, the UE makes an uplink transmission on HARQ process zero.

The uplink HARQ ACK/NACK feedback from the eNB for the uplink HARQ process zero arrives four subframes later (within subframe 4), shown by reference numeral 212.

Should the feedback at the subframe four be negative, a retransmission can then occur at the next subframe associated with UL HARQ process 0, shown by reference numeral 220.

Similarly, the remaining subframes can be used for different HARQ processes.

For time division duplex (TDD), the number of uplink HARQ processes and their cycle times are dependent on the exact TDD uplink and downlink configuration, but the uplink HARQ process indices cycle through sequentially in a similar manner to FDD. As will be apparent to those skilled in the art, the cycle times are the time period between two consecutive transmission opportunities for the same uplink HARQ process.

At each transmission opportunity, the HARQ process associated with that transmission opportunity may be instructed by the uplink HARQ entity to perform one of the following actions:

A new data transmission (as ordered by reception of an uplink grant on the PDCCH (via an appropriately configured DCI 0), reception of an uplink grant in a Random Access Response (RAR), or an uplink grant being generated from a configured UL Semi-Persistent Scheduling (UL SPS) grant. A new data grant being received via a DCI 0 can be identified as described further below.

An adaptive retransmission. This is ordered via reception of an appropriately configured DCI 0 on the PDCCH for the UL HARQ process. An adaptive retransmission order being received via a DCI 0 can be identified as described further below. An adaptive retransmission may be performed with different physical resources and/or parameters (signaled via the DCI 0) as the most recent transmission for the same transport block.

A non-adaptive retransmission. This is ordered via reception of a NACK on the Physical HARQ Indicator Channel (PHICH) for the preceding transmission opportunity for the same UL HARQ process (at which time a (re) transmission of the transport block was made). A non-adaptive retransmission is performed with the same physical resources as the most recent transmission for the same transport block but with a different redundancy version.

Nothing. This occurs if the transmission buffer of the UL HARQ process is empty or if the current HARQ feedback for that UL HARQ process is considered to be an ACK.

New data transmissions and adaptive retransmissions have priority over a non-adaptive retransmission for the same transmission opportunity. Further, each uplink HARQ process maintains three state variables, including a CURRENT_TX_NB, which counts the number of transmission opportunities for the UL HARQ process. The quantity is initialized to zero whenever a new data transmission is made, and is incremented by one for each transmission opportunity, regardless of whether or not an actual uplink scheduled transmission was made at that transmission opportunity. When the CURRENT_TX_NB reaches a configured threshold corresponding to a maximum number of allowed transmissions, then the transmission buffer of the uplink HARQ process and all parameters associated with that transport block are flushed. The maximum threshold may be maxHARQ-Tx for a normal uplink HARQ operation and maxHARQ-Msg3Tx for uplink HARQ operation in the context of a random access procedure.

NDI Flag

Each DCI 0 contains a 1-bit New Data Indicator (NDI) flag which may be used to signal whether the accompanying uplink grant represents a new data transmission. In other words, the signaling indicates whether a new Medium Access Control (MAC) Protocol Data Unit (PDU) or transport block is generated. Alternatively, an adaptive retransmission of an existing MAC PDU or transport block is signaled.

In normal operation with a UE's Cell Radio Network Temporary Identifier (C-RNTI), an NDI flag having the same value as the NDI flag for the most recently decoded DCI 0 for the current uplink HARQ process usually represents an adaptive retransmission. Conversely, an NDI flag having a toggled value relative to the NDI flag for the most recently decoded DCI 0 for the current uplink HARQ process usually represents a new data transmission.

In addition to dynamic scheduling, semi-persistent scheduling may exist, where an uplink transmission opportunity is provided for a certain duration at fixed intervals. For example, the process may be provided with an uplink grant which automatically recurs every 20 milliseconds. This may be done, for example, during procedures which require extended uplink data grants such as voice over Internet Protocol (VOIP) communications. In such a case, instead of using the C-RNTI to identify the UE, a semi-persistent scheduling (SPS) C-RNTI is also assigned to the UE.

When a DCI 0 addressed to the UE's SPS C-RNTI is decoded on the PDCCH, the NDI flag is interpreted differently than for the UE's C-RNTI. Specifically, toggling of the NDI flag is not considered. Instead, the NDI value is interpreted in accordance with Section 5.4.1 of the 3GPP Technical Specification (TS) 36.321 *"Evolved Universal Terrestrial Radio Access (E-UTRA); Medium Access Control (MAC) protocol specification"*, Version 10.3.0, October 2011, the contents of which are incorporated herein by reference.

If the NDI value is zero, then the UE attempts to validate the DCI 0 as either an uplink SPS grant activation or an uplink SPS grant release. If the DCI 0 is successfully validated as an uplink SPS grant activation, the UE configures a recurring uplink grant using the parameters provided in the DCI 0 and beginning in the current subframe. If the DCI 0 is successfully validated as an uplink SPS grant release, then the UE releases any currently configured uplink SPS grant.

Conversely, if the NDI value is one, then the DCI 0 represents an adaptive retransmission and is used to provide parameters to perform the adaptive retransmission.

Further, in addition to the C-RNTI and SPS C-RNTI, a Temporary C-RNTI may be used for Msg3 transmission in a random access procedure. The associated new data uplink grant is received in a random access response (RAR) rather than via a DCI 0 on the PDCCH. Consequently, a DCI 0 addressed to a Temporary C-RNTI corresponds to an adaptive retransmission (of Msg3) and thus the NDI flag is not taken into consideration in this case.

From the above, the new data indicator flag in a DCI 0 may be used, in part, to determine whether or not the corresponding transmission is considered to be a new data transmission or an adaptive retransmission. Reference is now made to Table 1, which shows what a DCI 0 received on the PDCCH can represent.

TABLE 1

Possible instructions corresponding to a DCI 0 received on the PDCCH

| Instruction | Addressed to RNTI | Description |
| --- | --- | --- |
| A | C-RNTI | New data grant |
| B | | Adaptive retransmission |
| C | SPS C-RNTI | UL SPS new data grant configuration |
| D | | UL SPS configured data grant release |

TABLE 1-continued

Possible instructions corresponding to a DCI 0 received on the PDCCH

| Instruction | Addressed to RNTI | Description |
| --- | --- | --- |
| E | | Adaptive retransmission for UL SPS |
| F | Temporary C-RNTI | Adaptive retransmission of Msg3 (random access procedure) |

As seen from Table 1 above, for the DCI 0 addressed to the C-RNTI, two instructions are possible, namely a new data grant and an adaptive retransmission.

For a SPS C-RNTI, three instructions are possible. The instructions include the new data grant configuration, a data grant release, or an adaptive retransmission for uplink SPS.

With regard to the Temporary C-RNTI, the DCI 0 provides for adaptive retransmission of the Msg3 for a random access procedure.

Figure 3:
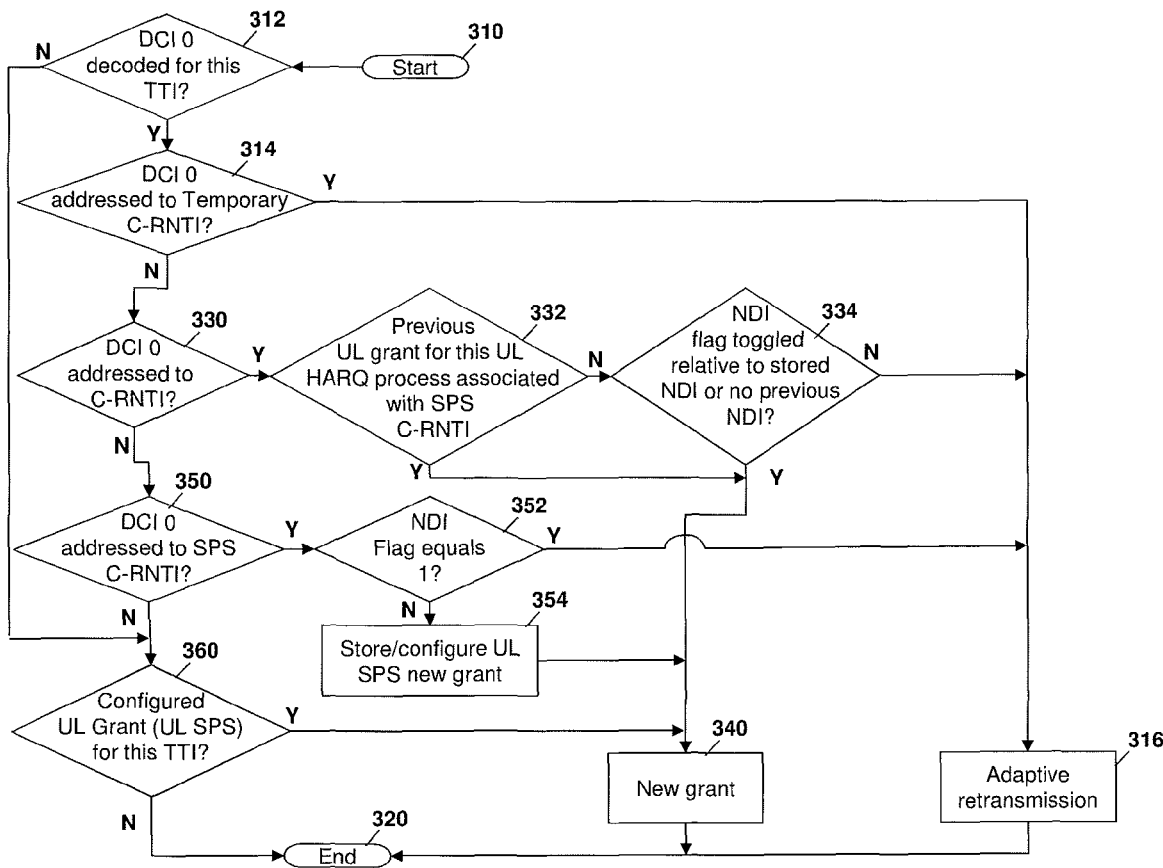
FIG. 3 is a process diagram showing a process for choosing between a new grant and an adaptive retransmission.

Reference is now made to FIG. 3. FIG. 3 shows a flow diagram for UE behavior.

In particular, the process of FIG. 3 starts at block 310 and proceeds to block 312 in which a check is made to determine whether or not a DCI 0 is decoded for the current transmission time interval. If yes, the process proceeds to block 314 in which a check is made to determine whether DCI 0 is addressed to a Temporary C-RNTI.

From block 314, if the DCI 0 is addressed to the Temporary C-RNTI, the process proceeds to block 316 in which an adaptive retransmission occurs and the process then proceeds to block 320 and ends.

Conversely, from block 314, if the DCI 0 is not addressed to a Temporary C-RNTI, the process proceeds to block 330 in which a check is made to determine whether the DCI 0 is addressed to the C-RNTI. If yes, the process proceeds to block 332 in which a check is made to determine whether a previous uplink grant for the uplink HARQ process was associated with a SPS C-RNTI. If no, the process proceeds to block 334 in which a check is made to determine whether an NDI flag in the DCI 0 has been toggled relative to the stored NDI or whether there is no previous NDI.

From block 334, if the NDI flag has not been toggled and there is a previous NDI value, then the process proceeds to block 316 in which adaptive retransmission occurs.

Conversely, from block 334 if the NDI flag has been toggled or if there is no previous NDI, the process proceeds to block 340 and a new grant is provided. The process then proceeds from block 340 to block 320 and ends.

Similarly, from block 332, if a previous uplink grant for the uplink HARQ process is associated with an SPS C-RNTI, then the process proceeds to block 340 for the new grant.

From block 330, if the DCI 0 is not addressed to the C-RNTI then the process proceeds to block 350 in which a check is made to determine whether or not the DCI 0 is addressed to the SPS C-RNTI. If yes the process then proceeds to block 352 and checks whether or not the NDI flag equals one. As discussed above, if the flag equals one then this indicates an adaptive retransmission and the process proceeds to block 316.

Conversely, if the NDI flag does not equal one, then the process proceeds to block 354 in which the uplink new grant is stored or configured and the process then proceeds to block 340 for the new grant. (This assumes that the DCI 0 has been validated as an SPS new grant activation, rather than as an SPS grant release.)

From block 350, if the DCI 0 is not addressed to SPS C-RNTI, or from block 312 if a DCI 0 is not decoded for the TTI, the process proceeds to block 360. In block 360 a check is made to determine whether an uplink grant for the TTI is configured through semi-persistent scheduling. If no, the process proceeds to block 320 and ends. Conversely, if there is an uplink grant for this TTI, the process proceeds from block 360 to 340 for the new grant.

Transport Block Size Determination

The transport block size corresponding to a particular DCI 0 decoded on a PDCCH is determined from a combination of the MCS value in the DCI 0 and the number of allocated resource blocks (also signaled within the DCI 0). This is described, for example, in Section 8.6 of 3GPP TS 36.213, "*Evolved Universal Terrestrial Radio Access (E-UTRA); Physical layer procedures*", Version 10.4.0, December 2011, the contents of which are incorporated herein by reference.

The MCS can vary between levels, including for example, Quadrature Phase Shift Keying (QPSK), 16 Quadrature Amplitude Modulation (16QAM), among others. The value for the MCS is signaled typically through a five-bit value in the DCI 0. The values of the MCS are associated with a look-up table on the UE.

If the signaled MCS value is 29, 30 or 31, then the size of the existing transport block for the current uplink HARQ process is used. This only makes sense if adaptive retransmission is being ordered since a new data transmission would not have an existing transport block size.

If the signaled MCS value lies between 0 and 28, then the MCS value is used to look up a transport block size (TBS) index value. The transport block size index value is used, together with a number of allocated resource blocks to obtain a transport block size. For example, the index value is found in Table 8.6.1-1 of the 3GPP TS 36.213 Technical Specification and the transport block size is found in Table 7.1.7.2.1-1 of the 3GPP TS 36.213 Technical Specification.

A signaled MCS value of 29, 30 or 31 also instructs the UE to use the same modulation level as was used for the most recent transmission of the same transport block. Conversely, if the eNB wishes to change the modulation level for an uplink HARQ adaptive retransmission, then the eNB must signal an MCS value between 0 and 28, inclusive, and must ensure that the combination of the MCS value and the number of allocated resource blocks result in the same transport block size as for previous transmissions of the same transport block. For example, a transport block of 1 resource block with an MCS of 14 (resulting in 16QAM modulation) may be the same size (256 bits) as a transport block of 4 resource blocks with an MCS of 4 (resulting in QPSK modulation).

From time to time, a UE may fail to detect a DCI 0 on a PDCCH which was transmitted by the eNB. Such a misdetection is termed a false negative and may occur due to poor or changing channel conditions, sudden interference and other variable conditions typically associated with wireless transmission channels.

Conversely, from time to time a UE may "detect" a DCI 0 on the PDCCH which does not actually represent a DCI 0 that was transmitted by the eNB. Such a "detection" is termed a false positive and may interfere with normal operation.

In particular, each DCI transmitted on the PDCCH is protected by a 16-bit cyclic redundancy check (CRC). If a random set of coded bit values is decoded, as would be obtained by receiving noise or interference with no signal present, then there is a $1/2^{16}$ possibility of the decoded result passing the CRC check, and hence becoming a false positive detection.

In each active 1 millisecond subframe, a UE may search up to 22 PDCCH candidate locations for a DCI 0. The probability of at least one false positive for this particular DCI size on a per subframe basis is thus $1-(1-1/2^{16})^{22}$ which is approximately 0.0366%, assuming that a real DCI 0 transmitted by the eNB is not present).

A DCI 1A (used for signaling a downlink transmission) is the same length as a DCI 0, and hence there is a 1-bit flag within the information bit payload to differentiate between DCI 0 and DCI 1A. Hence, only half of the detected false positives for a DCI size would correspond to DCI 0, and the probability of a false positive for a DCI 0 is thus half of 0.0366% or approximately 0.0168% per subframe per C-RNTI. Although the number is small, each second of active time represents 1000 subframes in one embodiment, and the probability of having at least one false positive detection of a DCI 0 in this time interval is equivalent to one minus the probability of all 1000 subframes not containing a false positive. Assuming that the probability of a false positive in a particular subframe is independent from other subframes, then the probability of at least one false positive detection of a DCI 0 is about 15.5% per C-RNTI per second.

Thus, occasionally a UE will likely experience a false positive detection of a DCI 0.

The expected UE behavior, when a UE decodes for a particular HARQ process a DCI 0 addressed to its C-RNTI, with a non-toggled NDI but with a different transport block size than the currently-stored transport block size of an existing transport block is not defined in the 3GPP TS 36.321 Technical Specifications.

The false detection could occur based on various scenarios. These include a correct detection on the PDCCH, followed by a false positive. If the UE correctly detects a DCI 0 and generates and transmits a new transport block and then the UE incorrectly detects a DCI 0 with a non-toggled NDI but a different transport block size before maxHarqTx is reached then the transport block size could be different for a non-toggled NDI on a DCI 0.

In an alternate embodiment, a false positive on the PDCCH may be followed by a correct detection. The UE incorrectly detects a DCI 0 with a toggled NDI, and generates and transmits a new transport block. The eNB does not note this spurious transmission since it was not expecting the UE to transmit. However, before maxHarqTx is reached, the UE then correctly detects a DCI 0 with a non-toggled NDI. In this case, the UE has already toggled its NDI flag due to the false positive but the eNB has not. In this case, a different transport block size may be provided as compared with the false positive.

In a further embodiment, a misdetection could occur on the PDCCH. In particular, the UE could correctly detect a DCI 0 on the PDCCH, and generate and transmit a new transport block. For example, this may be referred to as transport block 1. Before maxHarqTx for transport block 1 is reached, the UE misses detecting a DCI 0 with a toggled NDI on the PDCCH for transport block 2. However, the eNB's discontinuous transmission (DTX) capability fails to detect that no physical uplink shared channel (PUSCH) transmission was made and manages to decode the received noise such that the CRC passes. Before maxHarqTx for the first transport block is reached the eNB then sends a third DCI 0 with a toggled NDI for a transport block 3. However, since the UE did not successfully detect the second DCI 0, the third DCI 0 appears to have a non-toggled NDI but the transport block size has changed compared to the previous NDI value stored at the UE. The third DCI 0 appears as a new data transmission for the third transport block to the eNB but as an adaptive retransmission of the first transport block to the UE.

In a further embodiment, a misdetection could occur on the physical downlink control channel (PDCCH). In this embodiment, the UE detects a DCI 0 for a first transport block on the PDCCH, and generates and transmits a new transport block. The eNB then successfully decodes the received first transport block and transmits a new DCI 0 with a toggled NDI for a second transport block to the UE. However, the UE fails to detect the DCI 0 for the second transport block. The eNB is not able to decode the second transport block from the UE since the second transport block was never transmitted and the eNB scheduler decides to abandon the second transport block and sends a DCI 0 with a toggled NDI for a third transport block the UE. For example, the second transport block may be small, but the eNB has more resources available to allocate for a third transport block. This occurs before maxHARQ-Tx for the first transport block expires at the UE. The UE detects the DCI 0 for the third transport block. However, this appears, from the UE's viewpoint, to contain a non-toggled NDI but a different transport block size as compared to the most recently received DCI 0 for the same uplink HARQ process.

While the above embodiments may be rare, they can still occur. In this regard, the UE behavior in such situations is defined in accordance with the present disclosure. Specifically, various options are provided in the embodiments described below.

In one embodiment, a UE could consider a problematic DCI 0 as representing a new data transmission. This would be applicable to the DCI 0 addressed to a C-RNTI.

In a further embodiment, a problematic DCI 0 could be considered to represent an error and the corresponding uplink grant may be discarded. This may be performed for a DCI 0 addressed to a C-RNTI, an SPS C-RNTI or a Temporary C-RNTI.

In another embodiment, the problematic DCI 0 may be considered to represent an adaptive retransmission and the transport block size signaled within the DCI 0 may be ignored. This solution may be applicable to the C-RNTI, SPS C-RNTI and the Temporary C-RNTI addressed DCI 0s.

In a further embodiment, a UE could choose how to handle a situation using one of the three embodiments above. In another embodiment, the UE could choose one or more of the three embodiments based on the scenarios.

Further, in one embodiment the UE may choose to handle a problematic DCI 0 addressed to a C-RNTI differently than a problematic DCI 0 addressed to an SPS C-RNTI or a Temporary C-RNTI. Thus, any combination or subset of the above could be employed.

New Data Transmission.

In a first embodiment, if the UE decodes a DCI 0 addressed to its C-RNTI which appears to be an adaptive retransmission order but for which the transport block size has changed, then the UE may consider this to be a new data transmission and considers the NDI to have been toggled. This is regardless of the fact that the NDI is not toggled and the HARQ buffer (which may also be referred to as the transmit buffer or transmission buffer) of the corresponding uplink HARQ process is not empty.

Section 5.4.1 of 3GPP TS 36.321 may be modified to allow the DCI 0 to be considered as a new data transmission in this situation. An example of a modification of Section 5.4.1 of TS 36.321 is shown with regard to Appendix A.

As seen in Appendix A, the text of the specification has been modified to consider the NDI to have been toggled regardless of the value of the NDI if an uplink grant with a different transport block (TB) size is received. The addition to the current text of section 5.4.1 of the 3GPP TS 36.321 is shown in bold underlined italics in Appendix A.

Alternatively, or in addition to the above, the text in Section 5.4.2.1 of 3GPP TS 36.321 may be modified. The modification of the text is shown in bold underlined italics in Appendix B.

In particular, as seen in Appendix B, if the uplink grant was received on the PDCCH for the C-RNTI and the transport block size associated with the uplink grant is different compared to the transport block size for the previous transmission of the HARQ process, then the process of Appendix B is to deliver the newly-generated MAC PDU and the uplink grant and the HARQ information to the identified HARQ process and instruct the identified HARQ process to trigger a new transmission.

In a further alternative embodiment, Section 5.4.2.1 of 3GPP TS 36.321 can be modified differently, as shown in Appendix C. In particular, as seen in the bold underlined italics addition to the Section 5.4.2.1 in Appendix C, the existing specification could be modified to if the uplink grant was received on the PDCCH for the C-RNTI and either the HARQ buffer of the identified process is empty or the TB size associated with the uplink grant is different compared to the TB size for a previous transmission of the HARQ process, then a new transmission could be triggered.

Discard Uplink Grant.

In a further embodiment, if the UE decodes a DCI 0 addressed to its C-RNTI which appears to be an adaptive retransmission order where the NDI is considered not to have been toggled and the HARQ buffer of the corresponding uplink HARQ process is not empty, but the transport block size has changed, then the UE may consider this to be an error and discard that uplink grant.

In one embodiment, the discarding of the uplink grant may be accomplished through Section 5.4.1 of 3GPP TS 36.321. A modification to this Section is shown in regard to Appendix D. The addition to the Section is shown in bold underlined italics.

In particular, referring to Appendix D, the addition includes a check to see if the uplink grant is for the C-RNTI, the NDI is not considered to have been toggled, the HARQ buffer of the same HARQ process is not empty and the transport block size signaled in the uplink grant is different from the stored transport block size for the same HARQ process, then discard the uplink grant. Based on the above, the C-RNTI DCI 0 with a non-toggled NDI and a different transport block size is considered to be an error when the HARQ buffer is not empty, and thus the uplink grant is discarded.

Further, with regard to the SPS C-RNTI, a DCI 0 with an NDI equal to 1 and a different transport block size could be considered to be an error. Specifically, if the UE decodes a DCI 0 addressed to its SPS C-RNTI which appears to be an adaptive retransmission order (i.e. the NDI in the DCI 0 has a value of one) but for which the transport block size is different from the transport block size associated with the currently configured uplink SPS grant, then the UE can consider this to be an error and discard the uplink grant.

This may be accomplished by modifying Section 5.4.1 of 3GPP TS 36.321 as shown in bold underlined italics with regard to Appendix E.

Referring to Appendix E, a check is made when a DCI 0 for the SPS C-RNTI is received and its NDI is one. If the transport block size signaled in the uplink grant is different from the transport block size of the currently configured uplink grant then the uplink grant is discarded.

With regard to the Temporary C-RNTI, a Temporary C-RNTI DCI 0 with a different transport block size could be considered to be an error in accordance with one embodiment of the present disclosure. If the UE decodes a DCI 0 addressed to its Temporary C-RNTI during a random access procedure, then such a DCI 0 is automatically considered to represent an adaptive retransmission since the original new data uplink grant would have been received in a random access response rather than through a DCI 0 on the PDCCH. If the transport block size has changed from the most recent transport block size associated with the uplink HARQ process, the UE may consider this to be an error and discard the uplink grant.

The modification for the Temporary C-RNTI may be accomplished by modifying the text of Section 5.4.1 of 3GPP TS 36.321, as shown with regard to Appendix F. The new text is shown in bold underlined italics in Appendix F.

Referring to Appendix F, the addition to the Section includes a check to see if the uplink grant is for a UE's Temporary C-RNTI and if the transport block size signaled in the uplink grant is different from the stored transport block size for the same HARQ process and if yes, then to discard the uplink grant.

Ignore Signaled Transport Block Size

In further embodiments, the UE may ignore the signaled transport block size of the C-RNTI DCI 0 with a non-toggled NDI and a different transport block size when the HARQ buffer is not empty. In particular, if the UE decodes a DCI 0 addressed to its C-RNTI which appears to be an adaptive retransmission order where the NDI is considered not to have been toggled and the HARQ buffer of the corresponding uplink HARQ process is not empty, but the transport block size has changed, then the UE may consider this to be an adaptive retransmission order and may use the transport block size associated with the corresponding uplink HARQ process.

In one embodiment the above may be implemented by modifying the text of Section 5.4.1 of 3GPP TS 36.321, as shown with regard to Appendix G. Bold underlined italicized text in Appendix G is added to the technical specifications.

Referring to Appendix G, a test could be added where, if an uplink grant for a TTI has been received on the PDCCH (in a DCI 0), and if the uplink grant is for the UE's C-RNTI and the NDI is considered not to have been toggled and the HARQ buffer of the same HARQ process is not empty, then if the transport block size signaled in the uplink grant is different from the stored transport block size for the same HARQ process, the UE can ignore the transport block size signaled in the uplink grant and use the stored transport block size for the same HARQ process.

Similarly, with regard to the SPS C-RNTI, if the signaled transport block size of the SPS C-RNTI DCI 0 with an NDI equal to 1 is different, then the UE could ignore the different transport block size. Specifically, if the UE decodes a DCI 0 addressed to its SPS C-RNTI which appears to be an adaptive retransmission order where the NDI equals 1 but the transport block size is different from the transport block size associated with the currently configured uplink SPS grant, then the UE considers this to be an adaptive retransmission order and can use the transport block size associated with the currently configured uplink grant. Thus, the UE ignores the signaled transport block size.

The above may be accomplished by modifying the relevant text of Section 5.4.1 of 3GPP TS 36.321, as shown with regard to Appendix H. The addition to the text is shown in bold underlined italics in Appendix H.

In particular, as seen in Appendix H, if the NDI of the received HARQ information is 1, then a test is performed to determine if the transport block size signaled in the uplink grant is different from the transport block size for the currently configured uplink grant and, if yes, then to ignore the transport block size signaled in the uplink grant and use the stored transport block size for the currently configured uplink grant.

In a further embodiment, the Temporary C-RNTI may also have the transport block size ignored. Specifically, a UE may ignore a signaled transport block size of a Temporary C-RNTI DCI 0 with a different transport block size. If the UE decodes a DCI 0 addressed to its Temporary C-RNTI during a random access procedure, then such a DCI 0 may be considered to represent an adaptive retransmission since the original new data uplink grant would have been received in a random access response rather than through a DCI 0 on the PDCCH. If the transport block size has changed from the most recent transport block size associated with the uplink HARQ process, then the UE may consider this to be an adaptive retransmission order but can use the stored transport block size associated with the corresponding uplink HARQ process.

The above may be accomplished by modifying the relevant text of Section 5.4.1 of 3GPP TS 36.321, as shown with regard to Appendix I. The addition to Section 5.4.1 is shown in bold underlined italics with regard to Appendix I.

In particular, in Appendix I a check may be made to determine if the uplink grant for the UE's Temporary C-RNTI and the transport block size signaled in the uplink grant is different from the stored transport block size for the HARQ process. If yes, the transport block size signaled in the uplink grant may be ignored and the stored transport block size for the same HARQ process may be used.

UE Implementation Selection

In one embodiment, the decision on how to handle a problematic DCI 0 could be left up to a UE implementation. This would allow the UE to autonomously choose one of the solutions from the embodiments above. Specifically, for the C-RNTI, the UE may choose between considering the problematic DCI as representing a new data transmission, as representing an error and discarding the uplink grant, or as representing an adaptive retransmission and ignoring the transport block size signaled. Similarly for the SPS C-RNTI, the UE may consider the problematic DCI as representing an error and discarding the uplink grant, or may consider the problematic DCI as representing an adaptive retransmission and ignoring the transport block size signaled.

Similarly, for a Temporary C-RNTI, the UE may consider the problematic DCI as representing an error and discarding the uplink grant or may consider the problematic DCI 0 as representing an adaptive retransmission but ignoring the transport block size signaled within the DCI 0. In order to accomplish such UE selection, a note may be added to Section 5.4.1 of 3GPP TS 36.321 as shown in Appendix J. In other situations, the note may not be needed.

Figure 4:
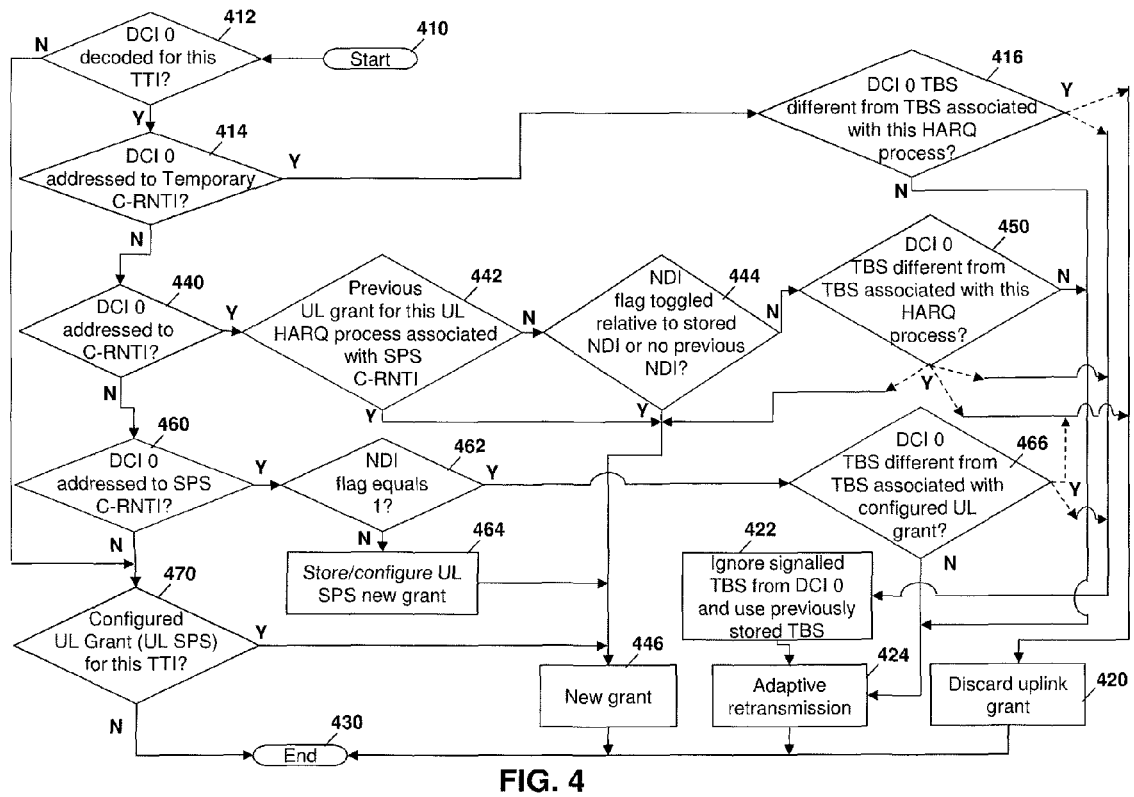
FIG. 4 is a process diagram showing a process for choosing between a new grant, adaptive retransmission possibly ignoring disparate transport block sizes, and discarding an uplink grant.

Reference is now made to FIG. 4, which is a process diagram illustrating the various options above. At various selection points, the UE has a choice between various options described. As will be appreciated by those in the art, some of the options in FIG. 4 may not be utilized or allowed on various UEs, and thus may include specific paths that the UE must take while other paths are discarded.

In particular, the process of FIG. 4 starts at block 410 and proceeds to block 412 in which a check is made to determine whether or not a DCI 0 is decoded for this transmission time interval. If yes, the process proceeds to block 414 in which a check is made to see if the DCI 0 is addressed to the Temporary C-RNTI.

If the DCI 0 is addressed to the Temporary C-RNTI then the process proceeds to block 416 in which a check is made to determine whether the DCI 0's transport block size is different from the TBS associated with the current HARQ process.

From block 416, two choices are available and these may be implemented on the UE or through technical specifications. In a first choice, if the transport block size differs, then the process may proceed from block 416 to block 420 and discard the uplink grant as described above. In a second option, if the transport block size differs from the transport block size associated with the current HARQ process, the process may proceed from block 416 to block 422 in which the UE ignores the signaled transport block size and uses the previously stored transport block size.

From block 420 the process proceeds to block 430 and ends.

From block 422, the process proceeds to block 424 in which adaptive retransmission occurs, and the process then proceeds to block 430 and ends.

If the transport size block does not differ from the associated transport block size at block 416, the process proceeds directly to block 424 in which adaptive retransmission occurs.

From block 414, if the DCI 0 is not addressed to the Temporary C-RNTI, the process proceeds to block 440 in which a check is made to determine if the DCI 0 is addressed to the C-RNTI. If yes, then the process proceeds to block 442 in which a check is made to determine whether the previous uplink grant for the uplink HARQ process is associated with the SPS C-RNTI. If no, the process proceeds to block 444 in which a check is made to determine whether the NDI flag is toggled relative to the stored NDI or no previous NDI exists. If yes, then the process proceeds from block 444 to block 446 in which a new grant is granted and then the process proceeds to block 430 and ends.

Conversely, from block 444, if the NDI flag is not toggled relative to the stored NDI flag and there is a previous NDI, the process proceeds to block 450 in which a check is made to determine whether the DCI 0's transport block size is different from the transport block size associated with the current HARQ process. If no, the process proceeds to block 424 in which adaptive retransmission occurs and then to block 430 and ends.

Conversely, from block 450 if the transport block size differs, then there are three options for the UE to choose. In particular, in accordance with one option the process may proceed to block 446 in which a new grant is provided.

Conversely, from block 450 the process may proceed to block 422 in which the transport block size that is signaled is ignored and the previous transport block size is utilized.

In a further alternate embodiment, from block 450 the process could proceed to block 420 in which the uplink grant is discarded.

From block 440, if the DCI 0 is not addressed to the C-RNTI, the process proceeds to block 460 in which a check is made to determine whether the DCI 0 is addressed to the SPS C-RNTI. If yes, the process proceeds to block 462 in which a check is made to determine whether the NDI flag equals 1. If no, then the process proceeds to block 464 in which the uplink SPS new grant is stored or configured (this assumes that the SPS C-RNTI has been validated as an SPS new grant activation rather than as an SPS grant release) and the process then proceeds from block 464 to block 446 for the new grant.

Conversely, if the NDI flag equals 1 at block 462, the process then proceeds to block 466 in which a check is made to determine whether the transport block size is different from the transport block size associated with a configured uplink grant. If no, the process proceeds to block 424 for adaptive retransmission.

Conversely, from block 466 if the transport block sizes differ, then the UE has two options. In a first option the UE may discard the uplink grant by proceeding to block 420.

In a second option, the UE may ignore the signaled transport size by proceeding to block 422.

From block 412, if there is no DCI decoded for the TTI, or from block 460 if the DCI 0 is not addressed to the SPS C-RNTI, the process proceeds to block 470 in which a check is made to determine whether there is a configured uplink grant for this TTI. If no, the process proceeds to block 430 and ends. Conversely, if there is a configured uplink grant for this TTI found in block 470 the process then proceeds to block 446 for the new grant process.

In one embodiment, the selection of the discarding of the uplink grant 420, considering the transmission to be a new grant at block 446, or ignoring the signaled transport block size at block 422 could be done based on the RNTI used. Thus, a DCI 0 (with a differing transport block size) for the C-RNTI could use a different solution than a DCI 0 (with a differing transport block size) for an SPS C-RNTI or a Temporary C-RNTI. For example, a DCI 0 (with a differing transport block size) for a C-RNTI could proceed to block 446 for a new grant while, at the same UE, a DCI 0 (with a differing transport block size) for an SPS C-RNTI could proceed to block 420 and discard the uplink grant. Further, the selection could be up to the UE to decide, or could be based on preconfigured criteria.

The above therefore provides for embodiments that allow UE behavior in the problematic scenario of decoding an uplink grant in the form of DCI 0 on the PDCCH which appears to be an adaptive retransmission order for an existing transfer block but in which the signaled transport block size has changed.

Figure 5:
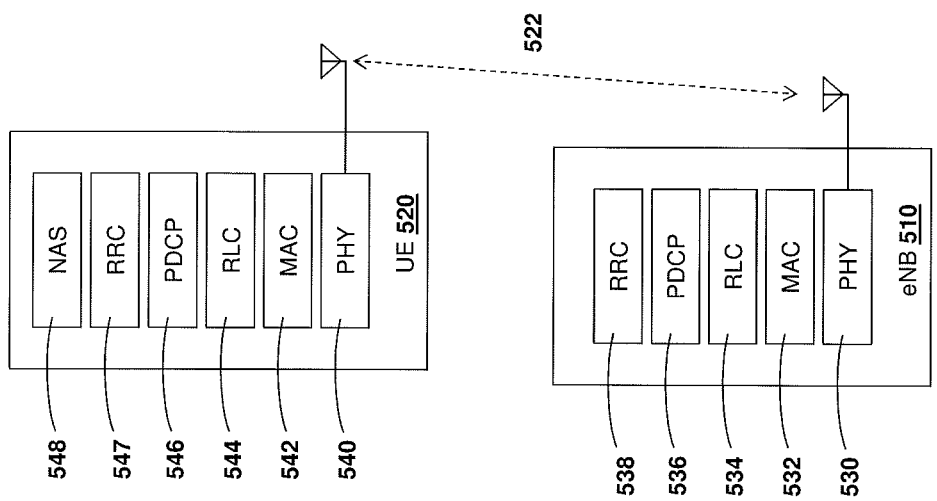
FIG. 5 is a schematic diagram showing an example protocol stack in a wireless communication system.

Reference is now made to FIG. 5, which shows a simplified architecture for communication between various elements in a system for the control plane. A similar protocol stack exists for the user plane. In the following the control plane protocol stack is used as an example. In particular, eNB 510 provides cell coverage to a first area and may serve a UE 520, which communicates with eNB 510 through wireless communication link 522.

As shown in the example of FIG. 5, each element includes a protocol stack for the communications with other elements. In the case of eNB 510, the eNB includes a physical layer 530, a medium access control (MAC) layer 532, a radio link control (RLC) layer 534, a packet data convergence protocol (PDCP) layer 536 and a radio resource control (RRC) layer 538.

In the case of UE 520, the UE includes a physical layer 540, a MAC layer 542, an RLC layer 544, a PDCP layer 546, an RRC layer 547 and a non-access stratum (NAS) layer 548.

Communications between the entities, such as between eNB 510 and UE 520, generally occur within the same protocol layer between the two entities. Thus, for example, communications from the RRC layer at eNB 510 travel through the PDCP layer, RLC layer, MAC layer and physical layer and get sent over the physical layer to UE 520. When received at UE 520, the communications travel through the physical layer, MAC layer, RLC layer, PDCP layer to the RRC level of UE 520. Such communications are generally done utilizing a communications sub-system and a processor, as described in more detail below.

The above may be implemented by any UE. One exemplary device is described below with regard to FIG. 6.

UE 600 is typically a two-way wireless communication device having voice and data communication capabilities. UE 600 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 600 is enabled for two-way communication, it may incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. In some networks network access is associated with a subscriber or user of UE 600. A UE may require a removable user identity module (RUIM) or a subscriber identity module (SIM) card in order to operate on a CDMA network. The SIM/RUIM interface 644 is normally similar to a card-slot into which a SIM/RUIM card can be inserted and ejected. The SIM/RUIM card can have memory and hold many key configurations 651, and other information 653 such as identification, and subscriber related information.

Figure 6:
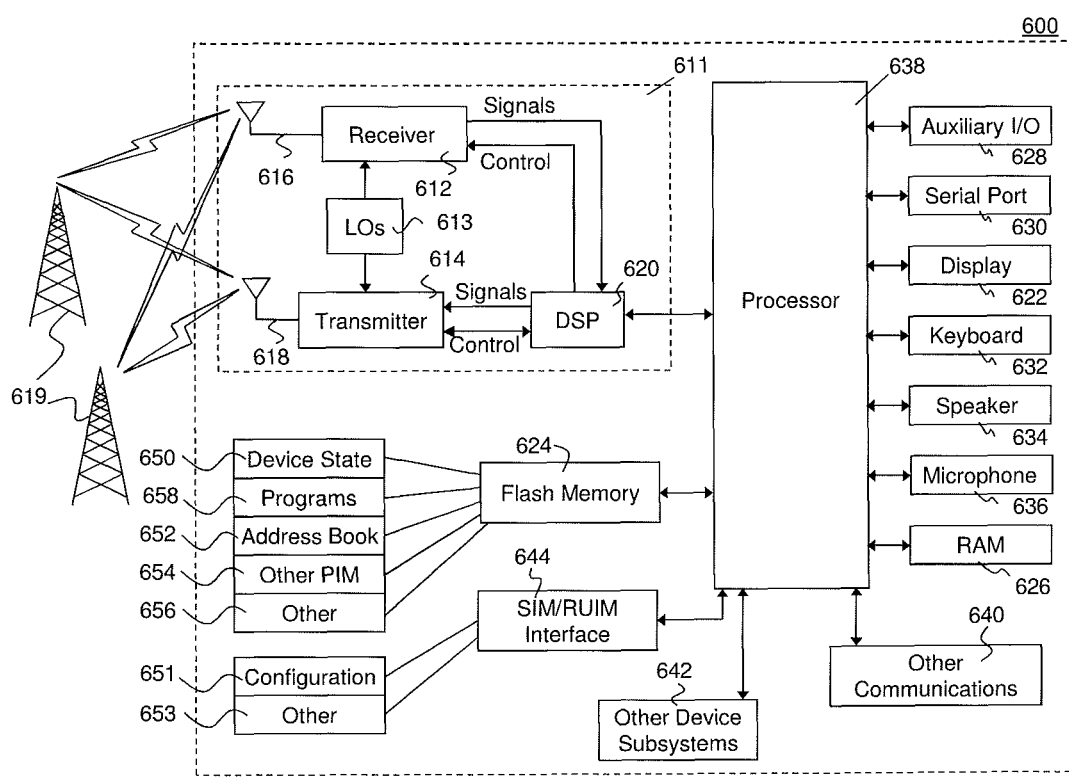
FIG. 6 is a block diagram of an example user equipment.

When required network registration or activation procedures have been completed, UE 600 may send and receive communication signals over the network 619. As illustrated in FIG. 6, network 619 can consist of multiple base stations communicating with the UE.

Signals received by antenna 616 from communication network 619 are input to receiver 612, which may perform such common receiver functions as signal amplification, frequency down conversion, filtering, channel selection and the like. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

UE 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Processor 638, in addition to its operating system functions, may enable execution of software applications on the UE. A predetermined set of applications that control basic operations, including at least data and voice communication applications for example, will normally be installed on UE 600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 619. Further applications may also be loaded onto the UE 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both. For example, secure communication applications may enable electronic commerce functions and other such financial transactions to be performed using the UE 600.

In a data communication mode, a received signal such as a text message or web page download will be processed by the communication subsystem 611 and input to the processor 638, which may further process the received signal for output to the display 622, or alternatively to an auxiliary I/O device 628.

A user of UE 600 may also compose data items such as email messages for example, using the keyboard 632, which may be a complete alphanumeric keyboard or telephone-type keypad, among others, in conjunction with the display 622 and possibly an auxiliary I/O device 628. Such composed items may then be transmitted over a communication network through the communication subsystem 611.

For voice communications, overall operation of UE 600 is similar, except that received signals would typically be output to a speaker 634 and signals for transmission would be generated by a microphone 636. Alternative voice or audio I/O subsystems, such as a voice message recording subsystem, may also be implemented on UE 600. Although voice or audio signal output is generally accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type UE for which synchronization with a user's desktop computer (not shown) may be desirable, but is an optional device component. Such a port 630 would enable a user to set preferences through an external device or software application and would extend the capabilities of UE 600 by providing for information or software downloads to UE 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the UE to a computer to act as a modem.

Other communications subsystems 640, such as a short-range communications subsystem, is a further optional component which may provide for communication between UE 600 and different systems or devices, which need not necessarily be similar devices. For example, the subsystem 640 may include an infrared device and associated circuits and components or a Bluetooth™ communication module to provide for communication with similarly enabled systems and devices. Subsystem 640 may further include non-cellular communications such as WiFi or WiMAX, or near field communications, among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

APPENDIX A

<u>5.4.1 UL Grant reception</u>

In order to transmit on the UL-SCH the UE must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers.

When *timeAlignmentTimer* is running and the UE has a C-RNTI, Semi-Persistent Scheduling C-RNTI, or Temporary C-RNTI, the UE shall for each TTI :

- if an uplink grant for this TTI has been received on the PDCCH for the UE's C-RNTI or Temporary C-RNTI; or

- if an uplink grant for this TTI has been received in a Random Access Response:

- if the uplink grant is for UE's C-RNTI and if the previous uplink grant delivered to the HARQ entity for the same HARQ process was either an uplink grant received for the UE's Semi-Persistent Scheduling C-RNTI or a configured uplink grant *or an uplink grant with a different TB size*:

- consider the NDI to have been toggled regardless of the value of the NDI.

- deliver the uplink grant and the associated HARQ information to the HARQ entity for this TTI.

[…]

APPENDIX B

<u>5.4.2.1 HARQ entity</u>

There is one HARQ entity at the UE, which maintains a number of parallel HARQ processes allowing transmissions to take place continuously while waiting for HARQ the feedback on the successful or unsuccessful reception of previous transmissions.

The number of parallel HARQ processes is specified in [2], clause 8.

At a given TTI, if an uplink grant is indicated for the TTI, the HARQ entity identifies the HARQ process for which a transmission should take place. It also routes the received HARQ feedback (ACK/NACK information), MCS and resource, relayed by the physical layer, to the appropriate HARQ process.

When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle is also a TTI bundle.

For transmission of Msg3 during Random Access (see section 5.1.5) TTI bundling does not apply.

For each TTI, the HARQ entity shall:
- identify the HARQ process associated with this TTI;

- if an uplink grant has been indicated for this TTI:

- if the received grant was not addressed to a Temporary C-RNTI on

PDCCH and if the NDI provided in the associated HARQ information has been toggled compared to the value in the previous transmission of this HARQ process; or

- if the uplink grant was received on PDCCH for the C-RNTI and the HARQ buffer of the identified process is empty; or

_- if the uplink grant was received on PDCCH for the C-RNTI and the TB size associated with the uplink grant is different compared to the TB size for the previous transmission of this HARQ process; or_

- if the uplink grant was received in a Random Access Response:

[...]

- deliver the MAC PDU and the uplink grant and the HARQ information to the identified HARQ process;

- instruct the identified HARQ process to trigger a new transmission.

- else:

- deliver the uplink grant and the HARQ information (redundancy version) to the identified HARQ process;

- instruct the identified HARQ process to generate an adaptive retransmission.

[...]

APPENDIX C

<u>5.4.2.1 HARQ entity</u>

There is one HARQ entity at the UE, which maintains a number of parallel HARQ processes allowing transmissions to take place continuously while waiting for HARQ the feedback on the successful or unsuccessful reception of previous transmissions.

The number of parallel HARQ processes is specified in [2], clause 8.

At a given TTI, if an uplink grant is indicated for the TTI, the HARQ entity identifies the HARQ process for which a transmission should take place. It also routes the received HARQ feedback (ACK/NACK information), MCS and resource, relayed by the physical layer, to the appropriate HARQ process.

When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle is also a TTI bundle.

For transmission of Msg3 during Random Access (see section 5.1.5) TTI bundling does not apply.

For each TTI, the HARQ entity shall:
- identify the HARQ process associated with this TTI;
- if an uplink grant has been indicated for this TTI:
  - if the received grant was not addressed to a Temporary C-RNTI on PDCCH and if the NDI provided in the associated HARQ information has been toggled compared to the value in the previous transmission of this HARQ process; or
  - if the uplink grant was received on PDCCH for the C-RNTI and _either_ the HARQ buffer of the identified process is empty _or the TB size associated with the uplink grant is different compared to the TB size for the previous transmission of this HARQ process_; or
  - if the uplink grant was received in a Random Access Response:

[...]

- deliver the MAC PDU and the uplink grant and the HARQ information to the identified HARQ process;
    - instruct the identified HARQ process to trigger a new transmission.
- else:
  - deliver the uplink grant and the HARQ information (redundancy version) to the identified HARQ process;
  - instruct the identified HARQ process to generate an adaptive retransmission.

[...]

APPENDIX D 5.4.1 UL Grant reception

In order to transmit on the UL-SCH the UE must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers.

When *timeAlignmentTimer* is running and the UE has a C-RNTI, Semi-Persistent Scheduling C-RNTI, or Temporary C-RNTI, the UE shall for each TTI :

- if an uplink grant for this TTI has been received on the PDCCH for the UE's C-RNTI or Temporary C-RNTI; or

- if an uplink grant for this TTI has been received in a Random Access Response:

- if the uplink grant is for UE's C-RNTI and if the previous uplink grant delivered to the HARQ entity for the same HARQ process was either an uplink grant received for the UE's Semi-Persistent Scheduling C-RNTI or a configured uplink grant:

- consider the NDI to have been toggled regardless of the value of the NDI.

- *if the uplink grant is for UE's C-RNTI, the NDI is considered not to have been toggled, the HARQ buffer of the same HARQ process is not empty, and the TB size signalled in the uplink grant is different from the stored TB size for the same HARQ process:*

- *discard the uplink grant.*

- deliver the uplink grant and the associated HARQ information to the HARQ entity for this TTI.

[...]

APPENDIX E 5.4.1 UL Grant reception

In order to transmit on the UL-SCH the UE must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers.

When *timeAlignmentTimer* is running and the UE has a C-RNTI, Semi-Persistent Scheduling C-RNTI, or Temporary C-RNTI, the UE shall for each TTI :

- if an uplink grant for this TTI has been received on the PDCCH for the UE's C-RNTI or Temporary C-RNTI; or

- if an uplink grant for this TTI has been received in a Random Access Response:

- if the uplink grant is for UE's C-RNTI and if the previous uplink grant delivered to the HARQ entity for the same HARQ process was either an uplink grant received for the UE's Semi-Persistent Scheduling C-RNTI or a configured uplink grant:

- consider the NDI to have been toggled regardless of the value of the NDI.

- deliver the uplink grant and the associated HARQ information to the HARQ entity for this TTI.

- else, if an uplink grant for this TTI has been received on the PDCCH for the UE's Semi-Persistent Scheduling C-RNTI:

- if the NDI in the received HARQ information is 1:

- *if the TB size signalled in the uplink grant is different from the TB size for the currently configured uplink grant;*

- *discard the uplink grant.*

- consider the NDI not to have been toggled;- deliver the uplink grant and the associated HARQ information to the HARQ entity for this TTI.

else if the NDI in the received HARQ information is 0:

[...]

APPENDIX F

<u>5.4.1 UL Grant reception</u>

In order to transmit on the UL-SCH the UE must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers.

When *timeAlignmentTimer* is running and the UE has a C-RNTI, Semi-Persistent Scheduling C-RNTI, or Temporary C-RNTI, the UE shall for each TTI :

- if an uplink grant for this TTI has been received on the PDCCH for the UE's C-RNTI or Temporary C-RNTI; or

- if an uplink grant for this TTI has been received in a Random Access Response:

- if the uplink grant is for UE's C-RNTI and if the previous uplink grant delivered to the HARQ entity for the same HARQ process was either an uplink grant received for the UE's Semi-Persistent Scheduling C-RNTI or a configured uplink grant:

- consider the NDI to have been toggled regardless of the value of the NDI.

- *<u>if the uplink grant is for the UE's Temporary C-RNTI and the TB size signalled in the uplink grant is different from the stored TB size for the same HARQ process:</u>*

- *<u>discard the uplink grant.</u>*

- deliver the uplink grant and the associated HARQ information to the HARQ entity for this TTI.

[…]

APPENDIX G

5.4.1 UL Grant reception

In order to transmit on the UL-SCH the UE must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers.

When *timeAlignmentTimer* is running and the UE has a C-RNTI, Semi-Persistent Scheduling C-RNTI, or Temporary C-RNTI, the UE shall for each TTI :
- if an uplink grant for this TTI has been received on the PDCCH for the UE's C-RNTI or Temporary C-RNTI; or

- if an uplink grant for this TTI has been received in a Random Access Response:

- if the uplink grant is for UE's C-RNTI and if the previous uplink grant delivered to the HARQ entity for the same HARQ process was either an uplink grant received for the UE's Semi-Persistent Scheduling C-RNTI or a configured uplink grant:

- consider the NDI to have been toggled regardless of the value of the NDI.

- *if the uplink grant is for UE's C-RNTI, the NDI is considered not to have been toggled, the HARQ buffer of the same HARQ process is not empty, and the TB size signalled in the uplink grant is different from the stored TB size for the same HARQ process:*

- *ignore the TB size signalled in the uplink grant and use the stored TB size for the same HARQ process.*

- deliver the uplink grant and the associated HARQ information to the HARQ entity for this TTI.

[...]

APPENDIX H 5.4.1 UL Grant reception

In order to transmit on the UL-SCH the UE must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers.

When *timeAlignmentTimer* is running and the UE has a C-RNTI, Semi-Persistent Scheduling C-RNTI, or Temporary C-RNTI, the UE shall for each TTI :

- if an uplink grant for this TTI has been received on the PDCCH for the UE's C-RNTI or Temporary C-RNTI; or

- if an uplink grant for this TTI has been received in a Random Access Response:

- if the uplink grant is for UE's C-RNTI and if the previous uplink grant delivered to the HARQ entity for the same HARQ process was either an uplink grant received for the UE's Semi-Persistent Scheduling C-RNTI or a configured uplink grant:

- consider the NDI to have been toggled regardless of the value of the NDI.

- deliver the uplink grant and the associated HARQ information to the HARQ entity for this TTI.

- else, if an uplink grant for this TTI has been received on the PDCCH for the UE's Semi-Persistent Scheduling C-RNTI:

- if the NDI in the received HARQ information is 1:

- *if the TB size signalled in the uplink grant is different from the TB size for the currently configured uplink grant;*

- *ignore the TB size signalled in the uplink grant and use the stored TB size for the currently configured uplink grant.*

- consider the NDI not to have been toggled;

- deliver the uplink grant and the associated HARQ information to the HARQ entity for this TTI.

- else if the NDI in the received HARQ information is 0:

[...]

APPENDIX I

5.4.1 UL Grant reception

In order to transmit on the UL-SCH the UE must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers.

When *timeAlignmentTimer* is running and the UE has a C-RNTI, Semi-Persistent Scheduling C-RNTI, or Temporary C-RNTI, the UE shall for each TTI :

- if an uplink grant for this TTI has been received on the PDCCH for the UE's C-RNTI or Temporary C-RNTI; or

- if an uplink grant for this TTI has been received in a Random Access Response:

- if the uplink grant is for UE's C-RNTI and if the previous uplink grant delivered to the HARQ entity for the same HARQ process was either an uplink grant received for the UE's Semi-Persistent Scheduling C-RNTI or a configured uplink grant:

- consider the NDI to have been toggled regardless of the value of the NDI.

- *if the uplink grant is for the UE's Temporary C-RNTI and the TB size signalled in the uplink grant is different from the stored TB size for the same HARQ process:*

- *ignore the TB size signalled in the uplink grant and use the stored TB size for the same HARQ process.*

- deliver the uplink grant and the associated HARQ information to the HARQ entity for this TTI.

[…]

APPENDIX J

*<u>NOTE: When an uplink grant is received for an HARQ process and the HARQ buffer of the corresponding HARQ process is not empty, the NDI value of the uplink grant is considered not to have been toggled relative to the value in the previous transmission of the corresponding HARQ process, and the TB size indicated in the uplink grant has changed compared to the stored TB size of the corresponding HARQ process, then the UE may choose to consider the NDI flag to have been toggled, to discard the uplink grant, or to proceed with an adaptive retransmission using the stored TB size of the corresponding HARQ process.</u>*

The invention claimed is:

1. A method comprising:
receiving, at a user equipment, a downlink control information comprising an indication for retransmission of a hybrid automatic repeat request (HARQ) process, the downlink control information for a semi persistent scheduling (SPS) cell radio network temporary identifier (C-RNTI) for the user equipment or for a Temporary cell radio network temporary identifier (C-RNTI) for the user equipment;
determining that a transport block size in the downlink control information has changed compared with a transport block size associated with the HARQ process or a previous uplink grant for the HARQ process;
handling the indication for retransmission of the HARQ process by ignoring the transport block size in the downlink control information and utilizing the transport block size associated with the HARQ process or with the previous uplink grant for the HARQ process for the retransmission; and
performing the retransmission.

2. The method of claim 1, wherein when the downlink control information is for a semi persistent scheduling (SPS) cell radio network temporary identifier (C-RNTI) for the user equipment, the handling for the SPS C-RNTI is independent of a handling for a Temporary C-RNTI.

3. The method of claim 1, wherein when the downlink control information is for a Temporary cell radio network temporary identifier (C-RNTI) for the user equipment, the handling for the Temporary C-RNTI is independent of a handling for a semi persistent scheduling (SPS) C-RNTI.

4. A user equipment comprising:
a processor; and
a communications subsystem,
wherein the user equipment is configured to:
receive a downlink control information comprising an indication of retransmission of a hybrid automatic repeat request (HARQ) process, the downlink control information for a semi persistent scheduling (SPS) cell radio network temporary identifier (C-RNTI) for the user equipment or for a Temporary cell radio network temporary identifier (C-RNTI) for the user equipment; and
determine that a transport block size in the downlink control information has changed compared with a transport block size associated with the HARQ process or with a previous uplink grant for the HARQ process;
handle the indication for retransmission of the HARQ process by ignoring the transport block size in the downlink control information and utilizing the transport block size associated with the HARQ process or with the previous uplink grant for the HARQ process for the retransmission; and
perform the retransmission.

5. The user equipment of claim 4, wherein when the downlink control information is for a semi persistent scheduling (SPS) cell radio network temporary identifier (C-RNTI) for the user equipment, the handling for the SPS C-RNTI is independent of a handling for a Temporary C-RNTI.

6. The user equipment of claim 4, wherein when the downlink control information is for a Temporary cell radio network temporary identifier (C-RNTI) for the user equipment, the handling for the Temporary C-RNTI is independent of a handling for a semi persistent scheduling (SPS) C-RNTI.

* * * * *